(12) United States Patent
Kocagoez et al.

(10) Patent No.: US 10,064,139 B2
(45) Date of Patent: Aug. 28, 2018

(54) CONTEXT-ASSISTED THERMAL MANAGEMENT SCHEME IN A PORTABLE DEVICE

(71) Applicant: Intel IP Corporation, Santa Clara, CA (US)

(72) Inventors: Kenan Kocagoez, Nuremberg (DE); Johannes Brendel, Erlangen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/998,243

(22) Filed: Dec. 26, 2015

(65) Prior Publication Data

US 2017/0188310 A1   Jun. 29, 2017

(51) Int. Cl.
*H04W 52/02* (2009.01)
*G06F 1/20* (2006.01)
*G06F 1/32* (2006.01)
*H04W 24/04* (2009.01)

(52) U.S. Cl.
CPC ........ *H04W 52/0261* (2013.01); *G06F 1/203* (2013.01); *G06F 1/206* (2013.01); *G06F 1/3209* (2013.01); *H04W 24/04* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC . H04W 52/0261; H04W 24/04; H04W 24/08; G06F 1/203; G06F 1/206; G06F 1/3209; Y02D 70/168; Y02D 70/26; Y02D 70/142; Y02D 70/00; Y02D 70/1262; Y02D 70/144; Y02D 70/164; Y02D 70/166
See application file for complete search history.

(56) References Cited

U.S. PATENT DOCUMENTS

| | | | |
|---|---|---|---|
| 2002/0143488 A1* | 10/2002 | Cooper | G06F 1/206 702/132 |
| 2006/0007870 A1* | 1/2006 | Roskowski | H04L 43/00 370/252 |
| 2006/0143486 A1* | 6/2006 | Lamdan | G06F 1/3203 713/320 |
| 2006/0179333 A1* | 8/2006 | Brittain | G11O 5/143 713/320 |
| 2011/0223920 A1* | 9/2011 | Wang | H04W 8/26 455/444 |
| 2013/0305359 A1* | 11/2013 | Gathala | G06F 21/56 726/22 |
| 2014/0240031 A1* | 8/2014 | Vadakkanmaruveedu | G06F 1/206 327/512 |

(Continued)

*Primary Examiner* — Dinh P Nguyen
(74) *Attorney, Agent, or Firm* — Schiff Hardin LLP

(57) ABSTRACT

Described herein are technologies related to an implementation of a thermal management scheme in a device. Particularly, a look up table or LUT is configured to include a data set of information (e.g., user-profile data, network-profile data) and a corresponding recommended thermal throttling mode. During regular device operation, conditions internal/external to the device is detected and the corresponding thermal throttling mode (from the LUT) is applied. In certain implementations, optimization algorithms are used in place of the LUT.

24 Claims, 7 Drawing Sheets

(56) References Cited

U.S. PATENT DOCUMENTS

| | | | | |
|---|---|---|---|---|
| 2014/0333281 A1* | 11/2014 | Li | ................... | G06F 1/3203 |
| | | | | 323/318 |
| 2015/0088333 A1* | 3/2015 | Delano | ............... | G05D 23/19 |
| | | | | 700/300 |
| 2015/0348226 A1* | 12/2015 | Vaishampayan | ........ | G06F 1/206 |
| | | | | 345/503 |
| 2016/0315676 A1* | 10/2016 | Mammoser | .......... | H04B 7/0456 |

* cited by examiner

CONTEXT-ASSISTED THERMAL MANAGEMENT SCHEME IN A PORTABLE DEVICE

BACKGROUND

Wireless mobile communication technology uses various standards and protocols to transmit data between a base station and a wireless communication device. In 3GPP radio access networks (RANs), such as LTE or 5G systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Upcoming 5G communication standard may considerably increase data traffic of mobile handhelds. That is, communication devices may demand higher dynamic power consumption to accommodate about ten fold increase in data reception and load processing load. In parallel with this, leakage current may also increase significantly due to lower transistor threshold voltage and reduced channel lengths. Thus, a combined jump in dynamic power as well as leakage power may result in an increase on energy density over a shrinking system-on-a-chip (SoC) area.

All these ingredients impose a severe constraint to chip designs as well as to the whole system. Intelligent thermal throttling methods may be applied to guarantee a sustainable operation of the device without initiating thermal runaway. The thermal runaway is set off by a cross coupling effect between dynamic power, leakage power and temperature. The total power, consisting of dynamic and leakage, initially contributes to the self-heating of the chip resulting in higher junction temperature. With rising junction temperature, the leakage power increases exponentially leading to a higher total power which in turn contributes to further heating.

Essentially a positive feedback loop is closed between leakage current and temperature. This constraint is nowadays so severe that it can easily be triggered in normal use-cases while the mobile device is still at mild thermal environment or device skin temperatures. As such, efficient thermal management systems are desired to overcome these challenges, which go beyond state-of-the art methods that rely solely on temperature sensors and electrical current monitors.

DETAILED DESCRIPTION

Figure 1:
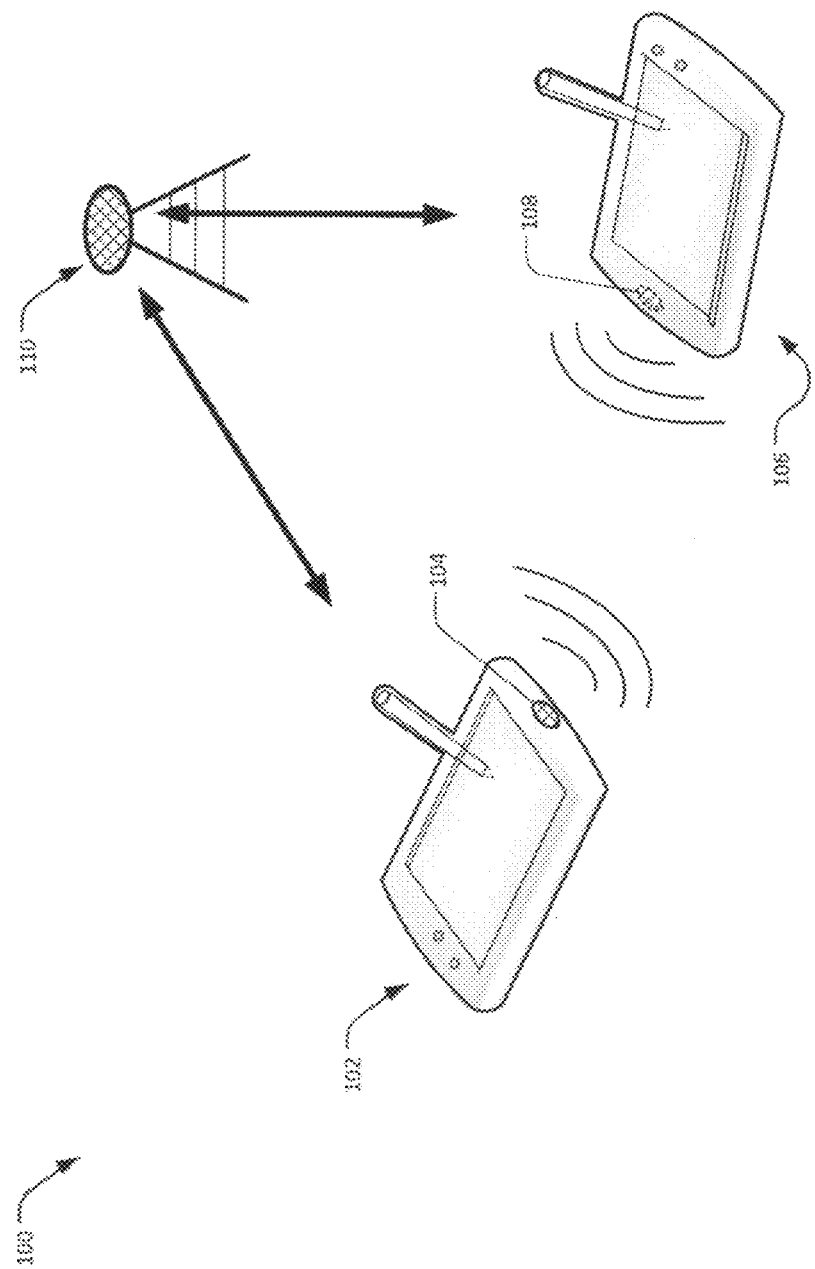
FIG. 1 illustrates an example scenario that implements a context-assisted thermal management module (SoC) in a portable device.

Described herein is a technology for implementing a context-assisted thermal management scheme in a device. Particularly, a look-up table (LUT) is configured to include a data set of information and recommended thermal throttling mode(s) that correspond to the data set of information.

Selecting the throttling modes based on a LUT is one implementation. Another implementation in selecting throttling modes is to apply optimization algorithms within a thermal management module which can calculate the optimum throttling methods dynamically dependent on the given constraints (e.g. QoS, temperature) and profile inputs.

The data set of information may further include: a user-profile data such as app(s) used by a user, duration of use and power generated by the use, etc.; a network-profile data based on perceived and reported CQI (3GPP LTE, Channel Quality Indicator) by UE to eNB; data packet amount and scheduling preferences of eNB to UE, UE (user equipment) received signal quality from eNB (e.g. SNR, Signal-Noise-Ratio), transmit power level (history) used by UE for eNB connection. Network-profile data may include transmit power and amount of data traffic in a connecting base station, duration of the transmit power, etc. Network-profile data may also include an amount of schedule of data transmission, and an identification of a particular base station. For example in 3GPP, a provided Cell ID may be used in identification of a particular base station. Such identifiers may be saved in memory, such as a LUT to capture and build profile information. Environmental-profile data such as an ambient temperature on a particular geo-location of the device.

In an implementation, a thermal management module system-on-a-chip (SoC) may include a profile detector, the LUT, and a thermal throttling engine component. In this implementation, the profile detector detects present conditions e.g., app(s) currently in use; the LUT facilitates the recommended thermal throttling mode based on the detected present condition; and the thermal throttling engine implements the recommended thermal throttling mode (e.g., burst mode, sustain-mode, or traffic rescheduling-mode) to obtain or maintain a desired device temperature. The thermal throttling mode may also be configured (e.g. burst mode→configure length and interval of bursts, sustain-mode→configure sustain threshold, rescheduling-mode→configure size of rescheduled traffic and scheduling plan). Combining more than one thermal throttling mode may also be implemented. The data set of information may further include system internal temperature measurement of the SoC (e.g. chip junction or PCB temperature, UE internal case temperature (e.g. at 1 mm distance from the PCB), UE front or back skin temperature) and electric current measurements (current consumption of power (sub)domains).

During an online pre-configuration of the LUT, the profile detector may facilitate collection, filtering, and/or summarizing of the data set of information. The filtered and summarized data set of information are further processed (e.g., by a processor algorithm) to match a recommended thermal throttling mode and these parameters are utilized to build up the LUT as described herein.

During regular device operation, the profile detector is configured to detect the present conditions that are internal or external to the device. Present conditions may be saved/added to known data values (i.e., conditions).

Based from the detected present conditions, the LUT is searched with regard to the corresponding recommended thermal throttling mode such as the burst-mode, the sustain-mode, or the traffic rescheduling-mode. At least one or a combination of these modes are subsequently implemented by the thermal throttling engine component to obtain or maintain a temperature threshold for the device.

In other implementations, the summarized data set of information from the LUT may further include a projected data set of information that may occur at another time instant, and the corresponding recommended thermal throttling mode for the projected data set of information. The projected data may be stored in the LUT by learning from previous profiles. Another method to generate the projected data is to apply for example, machine learning techniques or neuronal networks, which dynamically predict future profiles and the consequent thermal behavior of the device. This allows applying proactive thermal throttling methods.

In other implementations still, the LUT may be pre-configured offline or during the manufacturing of the SoC. In this other implementation, the profile detector may not be required to perform the collection, filtering, and summarizing of the data set of information since the data set of information and the corresponding recommended thermal throttling modes may be directly programmed to the SoC. However, in this other implementation, the user-profile data may be limited since user behavior may not be determined.

FIG. 1 is an example scenario 100 that utilizes the context-assisted thermal management module (SoC) in a portable device. The context-assisted thermal management module, for example, facilitates efficient control and adjustment of thermal temperature on the portable device while facilitating minimal impact on user experience. The scenario 100 shows a portable device 102 with an antenna 104, and another portable device 106 with an antenna 108.

The portable devices 102 or 106 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network base station 110 configured to facilitate communications between the portable device 102 and the other portable device 106. In another example, the portable device 106 may communicate with the other portable device 106 using Bluetooth (BT) features, near field communication (NFC) features, or through an access point (AP) (not shown). In these examples, the portable devices 102 and 106 may also be downloading apps, video streaming, etc. through an internet connection and thereby further increases thermal temperature within the portable devices. Thus, the implementations described herein may facilitate the context-assisted thermal management scheme that utilizes details of the data set of information as basis for activating different thermal throttling modes.

Figure 2:
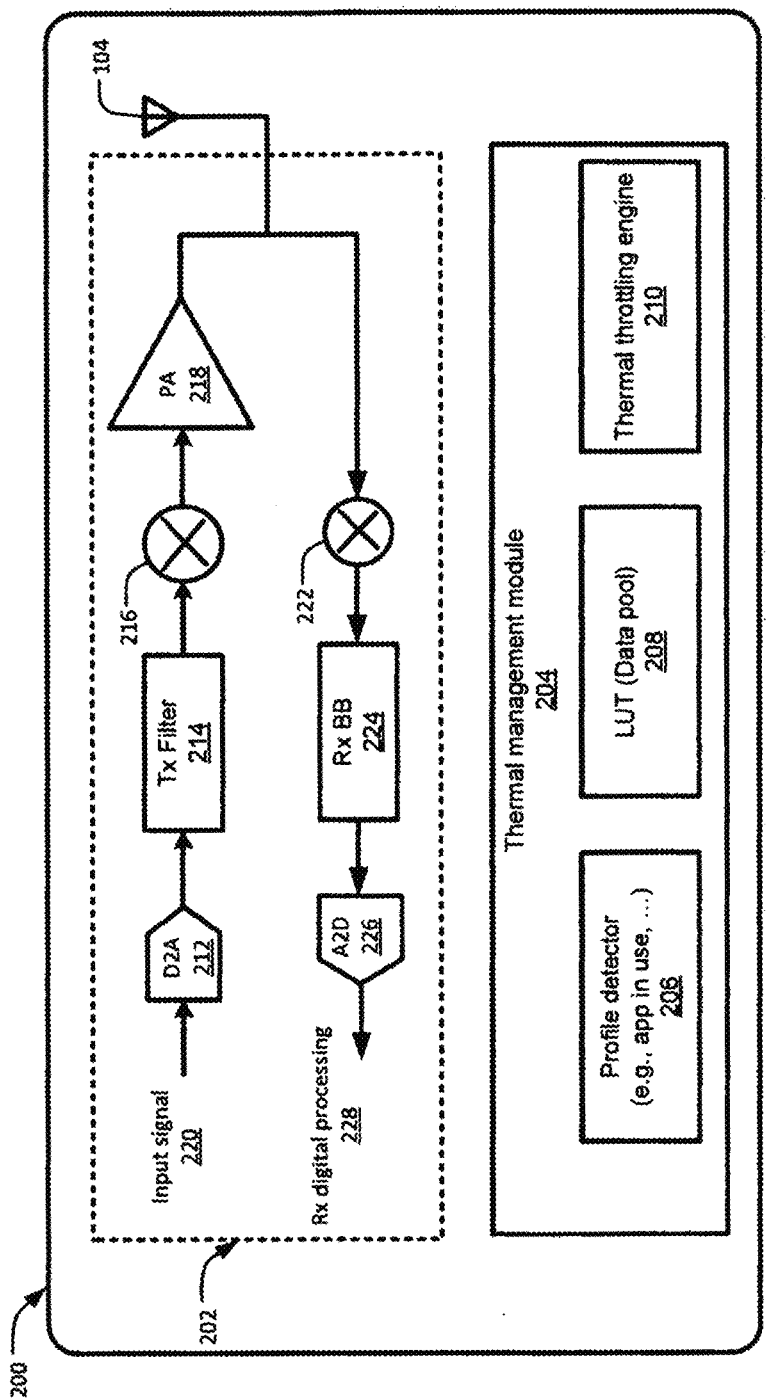
FIG. 2 is an example schematic block diagram of a portable device transceiver that utilizes a context-assisted thermal management module or SoC as described in present implementations herein.

FIG. 2 is an example schematic block diagram of a portable device transceiver 200 that utilizes the context-assisted thermal management module or SoC as described in present implementations herein. Although the portable device transceiver is utilized as an example location of the context-assisted thermal management module, the implementations described herein is not limited to the portable device transceiver as SoC location for the context-assisted thermal management scheme.

The portable device transceiver 200 may include a modem 202 such as a wireless fidelity (Wi-Fi) modem, a cellular modem, or a BT modem to enable the device to communicate through the AP, cellular network base station 110, or BT radio waves, respectively. Furthermore, the portable device transceiver 200 shows a thermal management module 204 that further includes a profile detector 206, a data pool (or hereinafter referred to as LUT 208), and a thermal throttling engine 210. Furthermore still, a transmit chain of the modem 202 may further include, but not limited to, a digital to analog converter (D2A) 212, a filter 214, a mixer 216, and an analog PA 218 to process an input signal 220. On the other hand, a receiver chain of the modem 202 may further include, but not limited to, receiver mixer 222, a receiver baseband filter 224, and an analog to digital converter (A2D) 226 that supplies digital baseband signals to a receiver digital processing 228. It is also to be understood that portable device transceiver 200 may be treated as a modem SoC that includes one or more processors and one or more memory components (not shown) for the LUT 208 as shown.

As a general overview of operations of the portable device transceiver 200, the thermal management module 204 (during online pre-configuration) may initially collect data set of information such as user-profile data, network-profile data, and an environmental-profile data. The collected data set of information are then filtered, summarized, and matched to a recommended at least one or a combination of thermal throttling modes. These parameters are subsequently stored to build up the LUT 208.

During regular transceiver operations, the profile detector 206 may detect present internal and external conditions on the portable device 102. Based from the detected conditions (e.g., app(s) presently used, transmit power of the cellular base station 110, etc.) and the corresponding recommended thermal throttling mode from the LUT 206, the thermal throttling engine 210 may be configured to implement the at least one or more recommended thermal throttling modes to control temperature within the device without degrading user experience.

In an implementation, the LUT 208 may be pre-configured offline (i.e., during chip manufacturing) or online. When the LUT 208 is pre-configured offline, the profile detector 206 may be configured to act as detector of present internal or external conditions that may trigger the at least one or more thermal throttling modes in the thermal throttling engine 210. However, when the LUT 208 is pre-configured online, the profile detector 206 may facilitate creation or building up of data set of information to the LUT 208. Thereafter (i.e., after the online pre-configuration), the profile detector 206 may again perform detection of the present internal or external conditions to facilitate activation of the necessary thermal throttling modes in the thermal throttling engine 210.

With continuing reference to FIG. 2, the thermal throttling engine 210 may implement at least one or a combination of thermal throttling modes depending upon the pre-configured recommendations from the LUT 208. For example, in the case where the recommended thermal throttling modes includes activation of the traffic rescheduling traffic mode, data packet transmission of the input signal 228 or the processing of received signals at the Rx digital processing 228 may be controlled and rescheduled to another time instant for purposes of thermal budgeting as further discussed below.

The modem 202, as shown, illustrates the input signal 220 (i.e., original signal to be transmitted) that is converted into analog signal, filtered, and amplified through the PA 218 prior to transmission through the antenna 104. During receiving, the received signal may be first amplified, down-converted, and converted into digital baseband signals for further processing at the Rx digital processing 228.

Although the example portable device transceiver 200 illustrates in a limited manner basic components of the receiver of the portable device, other components such as battery, one or more processors, SIM card, etc. were not described in order to simplify the embodiments described herein.

Figure 3:
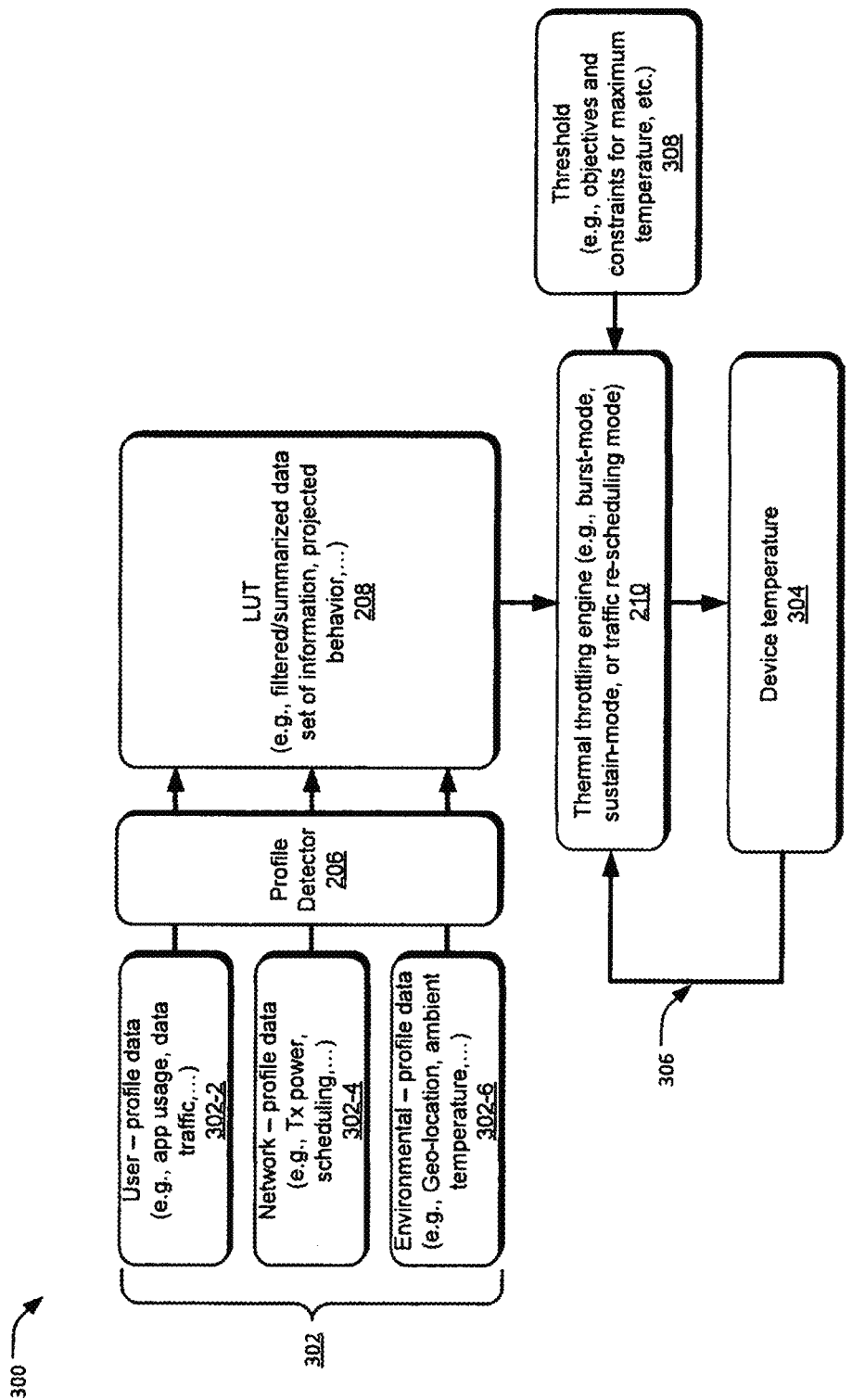
FIG. 3 is an example schematic block diagram illustrating an implementation of a context-assisted thermal management module as described in present implementations herein.

FIG. 3 is an example schematic block diagram 300 illustrating an implementation of the context-assisted thermal management module as described in present implementations herein. The schematic block diagram 300, for example, is an implementation of the thermal management module 204 of FIG. 2.

As shown, the block diagram 300 illustrates a data set of information 302 such as a user-profile data 302-2, a network-profile data 302-4, and an environmental-profile data 302-6, which are pre-configured or stored as the LUT 208 during the SoC manufacturing in one implementation. In another implementation (i.e., online LUT pre-configuration), the profile detector 206 may facilitate detection and collection of the data set of information 302. In these implementations, the data set of information 302, and the recommended thermal throttling mode(s) that correspond to the collected data set of information 302 may provide the building blocks for the LUT 208.

The block diagram 300 further illustrates the thermal throttling engine 210 that implements different thermal throttling modes; a feedback 306 that may indicate whether a desired temperature of a device temperature 304 has been satisfied; and threshold 308 that may further supply control signals to operations of the thermal throttling engine 210.

In an implementation, the LUT 208 may further store a projected data set of information 302 that may eventually occur at a particular time instant and furthermore, the LUT 208 may store the recommended thermal throttling mode(s) corresponding to the projected data set of information 302. In this implementation, the thermal throttling engine 210 may activate the recommended thermal throttling mode even without the need for the profile detector 206 to facilitate the thermal throttling mode activation. That is, the profile detector 206 need not perform the detection of the present internal or external conditions that may provide the parameter for searching the recommended thermal throttling modes from the LUT 208.

As described herein, the user-profile data 302-2 may include a user behavior with regard to use of the portable device. For example, the user-profile data 302-2 may include favorite app(s) used by the user at a particular time or from previous time periods. The user-profile data 203-2 may further include information about the app(s) such as video streaming, web browsing, GPS, instant messaging, and the like. In another example, the user-profile data 302-2 may include amount and capacity of data traffic consumed during the particular time by the user, the corresponding app(s) for the data traffic, and other user behavior parameters related to routine use of the portable device e.g., use of BT communication, NFC communications, etc. Furthermore, user-profile data 302-2 can include time dependent consumption and generation of data traffic and or data throughput requests by a user. In other words, when does a user request high data or average/low throughput, when the high frequency of consecutive data packet requests.

Further examples of the user-profile data 302-2 includes: Scenario 1) The user shows high persistent data traffic, e.g. during video streaming→In this case, the thermal management unit should limit the total data rate to reach a thermal sustainable mode instead of applying burst modes or switching off the modem SoC completely to rebuild the thermal budget. With this approach, the user experience is only slightly affected, e.g. by reduced video resolution but the video stream does not break down. Scenario 2) The user shows time wise high data usage, e.g. web browsing→In this case, the thermal management unit can predict idle periods with no further data requests in the near future (e.g. user reads web content). It allows to consume the thermal budget completely in the periods with high data usage as the thermal budget can rebuild during the predicted idle periods. Scenario 3) The user requests data which is not latency critical, e.g. synchronization with the cloud→The thermal management unit postpones the data transmission dependent on the current available thermal budget.

With regard to the network-profile data 302-4, the collected information may include data about parameters of the cellular network base station 110 that provides network communications between the portable devices. For example, the parameters include the transmit power profile of the UE used in connected mode with a specific cellular network base station. The parameters data may be profiled and remembered (e.g. bases station catalogue) which is connected to and profiled as scheduling behavior for a particular/specific cellular network base station. In another example (where the parameters collected are related to NFC communications), the parameters may include data traffic amount and transmit power when the NFC communication feature is activated. In another example where the parameters collected are related to Wi-Fi communications, the parameters may include data traffic at a particular time of day, transmit power during Wi-Fi operation, and the like.

With regard to the environmental-profile data 302-6, the collected information may include data about conditions external to the portable device 102. For example, the external conditions may include ambient temperature of the device, current weather conditions, weather forecasts, physical location or geo-location of the phone (e.g. indoor, outdoor, bag, skin contact) and the thermal resistance to the environment.

After the collection of the data set of information 302, and during the pre-configuration period to create or build up the LUT 208, a processor (not shown) may utilize an algorithm to filter and summarize the collected data set of information 302. Furthermore, the algorithm may generate the recommended at least one thermal throttling mode to be activated by the thermal throttling engine 210 for the particular filtered and summarized collected data set of information 302. The recommended at least one thermal throttling mode, for example, is activated to maintain a desired threshold parameter, which may supplied by the threshold 308.

With continuing reference to FIG. 3, and during regular operations of the portable device 102, the profile detector 206 may be configured to detect present internal and/or external conditions on the portable device 102. The present internal and/or external conditions may similarly include parameters and conditions that are defined by the data set of information 302.

For example, the profile detector 206 detects a particular Wi-Fi signal source (i.e., network-profile data 302-4), time of day (i.e., user-profile data 302-2), and geo-location (i.e., environmental-profile data 302-6) of the portable device 102. In this example, the processor searches for the recommended thermal throttling mode from the LUT 208 that correspond to this internal/external present conditions i.e., particular Wi-Fi signal source, time of day, and geo-location of the portable device 102.

After locating the recommended thermal throttling mode, the processor may supply a control signal (not shown) to the thermal throttling engine 210 that may implement the recommended thermal throttling mode.

In another example where the recommended thermal throttling mode is based from a projected user behavior, projected network-profile data 302-4, and/or projected environmental-profile data 302-6, the profile detector 206 may not be required to perform detection of internal/external present conditions in order to activate the recommended thermal throttling mode for the projected data set of information 302.

For example, for the projected data set of information 302 such as during weekends and particularly between 8-11 pm, the thermal throttling engine 210 may implement the recommended thermal throttling mode without basing the implementation from present conditions internal or external to the device. In this example, the user experience is lightly affected due to a projected thermal budgeting even if the profile detector 206 is deactivated.

In an implementation, the thermal throttling engine 210 may include the burst-mode, sustain-mode, and traffic rescheduling mode. The burst-mode, for example, may include triggering of "passive-cooling" actions when certain thresholds are crossed and disabled after a desired temperature is reached. The sustain-mode may include monitoring of energy consumption of the portable device 102 and limiting power usage such that the portable device 102 may be operated sustainable for a given temperature condition.

As described herein, the traffic rescheduling-mode may include transmission or reception of data to another time instant such as during idle periods or during downtime where data traffic is light. For example, updating of app(s), which are of less importance to the user, during high data traffic may be relocated to another particular time instant. In this example, the lessening of data traffic may contribute to the thermal management scheme as described herein.

Figure 4:
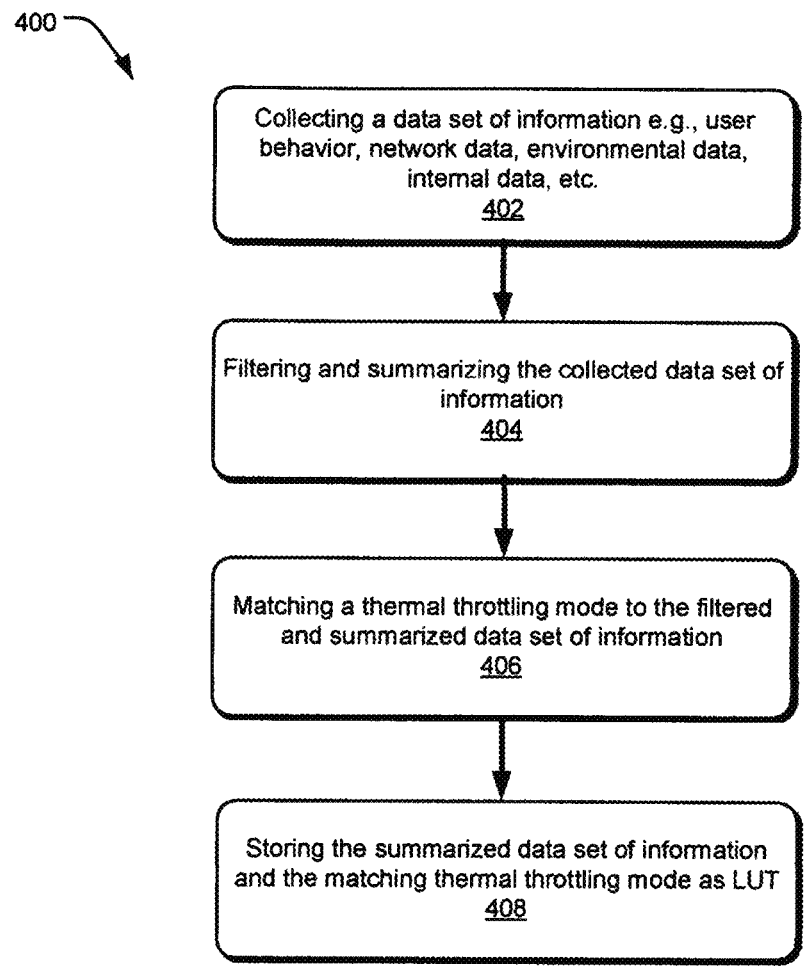
FIG. 4 illustrates an exemplary process for configuring of a LUT as described in the present implementations herein.

FIG. 4 shows an example process flowchart 400 illustrating an example method for configuring of the LUT as described in the present implementations herein. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, collecting a data set of information is performed. For example, during online pre-configuration of the SoC (i.e., thermal management module), the data set of information 302 is collected through the profile detector 206. The data set of information 302 may include the user-profile data 302-2, network-profile data 302-4, and/or environmental-profile data 302-6.

In other implementations, such as during offline pre-configuration of the SoC, the data set of information 302 may be directly programmed to the SoC. In this other implementation, however, limited user-profile data 302-2 may be programmed directly to the chip as the user behavior cannot be ascertained during the offline pre-configuration.

At block 404, filtering and summarizing the collected data set of information is performed. For example, the processor through an algorithm may filter relevant data and summarize the collected data set of information. In this example, the summary may include the frequency of occurrence, time of occurrence, app(s) type and duration, data traffic, ambient temperature at a particular time, etc.

At block 406, matching a recommended thermal throttling mode to the filtered and summarized data set of information. For example, the algorithm may consider time recovery or thermal budget rebuilding for each thermal throttling mode, duration for next high performance period, temperature cooling period duration, amount of data traffic that requires traffic rescheduling, and the like. In this example, the at least one or the combination of the thermal throttling modes may be matched to obtain desired temperature results or threshold in the temperature device 304.

In other implementations, the summary of the data set of information may include the projected data set of information that may occur at another time instant or future time. To this end, the algorithm may further calculate the recommended thermal throttling modes for the projected data set of information. For example, if the user behavior (based from the collected user-profile data 302-2) is projected to have high data traffic due to video streaming at a particular time on a weekend, then the corresponding recommended thermal throttling mode may be pre-configured to occur during that particular time and day.

At block 408, storing the filtered and summarized data set of information and the matching thermal throttling mode as LUT is performed.

Figure 5:
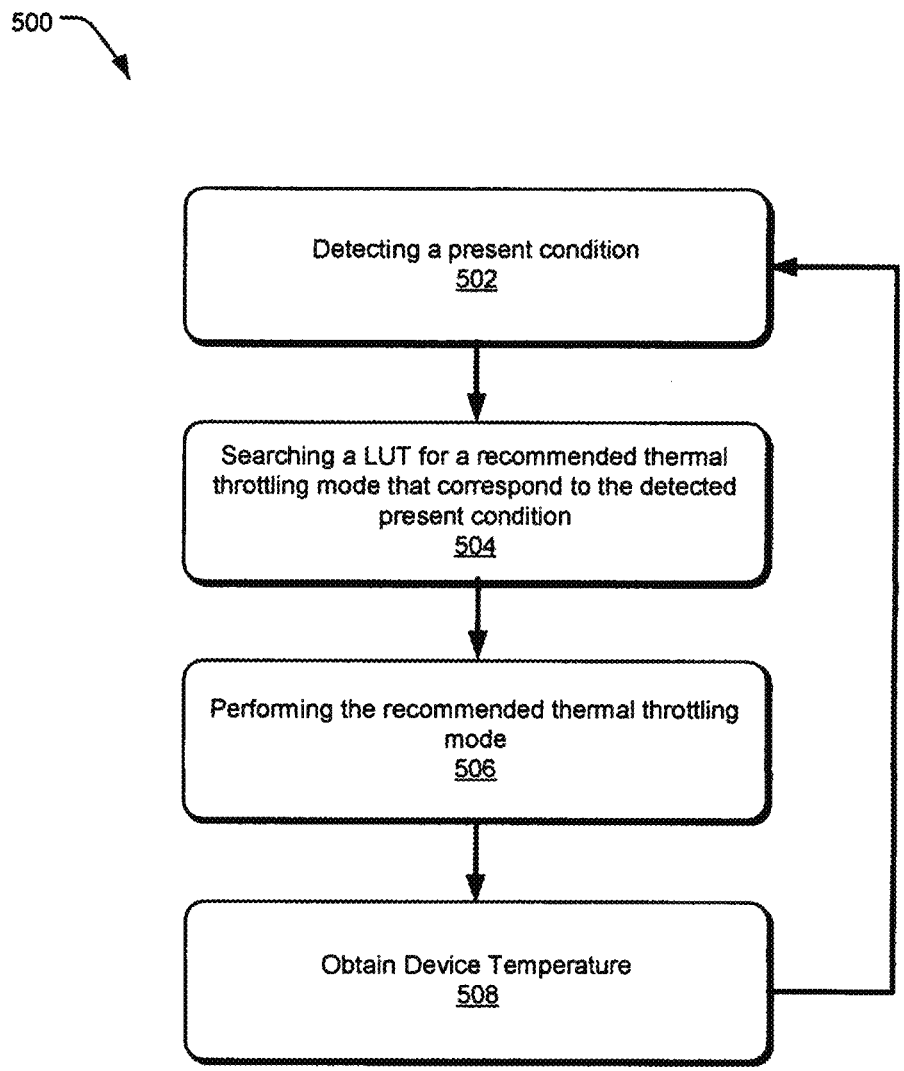
FIG. 5 illustrates an exemplary process for implementing a modem thermal management scheme as described in present implementations herein.

FIG. 5 shows an example process flowchart 500 illustrating an example method for implementing a modem thermal management scheme as described in present implementations herein. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, detecting a present condition of a portable device is performed. For example, the profile detector 206, during regular operations of the portable device 102, is configured to detect the present internal and external conditions such as what app(s) are currently running within the portable device, amount of data traffic for the running app(s), present ambient temperature external to the device, current weather forecast, geo-location (e.g., home, office, moving vehicle, etc.), and the like. In this example, the detected conditions may be selected from the group consisting of the user-profile data 302-2, network-profile data 302-4, and/or the environmental-profile data 302-6.

At block 504, searching the LUT for a recommended thermal throttling mode based on the detected present condition of the portable device is performed. For example, the processor searches the LUT 208 for the recommended thermal throttling mode based on the detected internal or external conditions on the portable device 102. In this example, the recommended thermal throttling mode may include at least one or more combinations of the thermal throttling modes as described above.

At block 506, performing the recommended thermal throttling mode is performed. For example, the thermal throttling engine 210 may be configured to implement the burst-mode, sustain-mode, traffic rescheduling-mode, or a combination thereof.

At block 508, obtaining a desired threshold is performed. For example, when a particular temperature threshold for the device temperature 304 is obtained, then at block 502, the modem thermal management module or SoC may further perform another detection of the present condition at block 502. The thermal throttling is a constant optimization. When the device temperature was not obtained with the last throttling mode, reapplying the previous mode might also not help. It is needed go back to 502 and to detect the present condition again and applying a different throttling mode with different parameters Otherwise, when the particular temperature threshold for the device temperature 304 is not yet satisfied, then at block 506, the recommended thermal throttling mode is again implemented.

Figure 6:
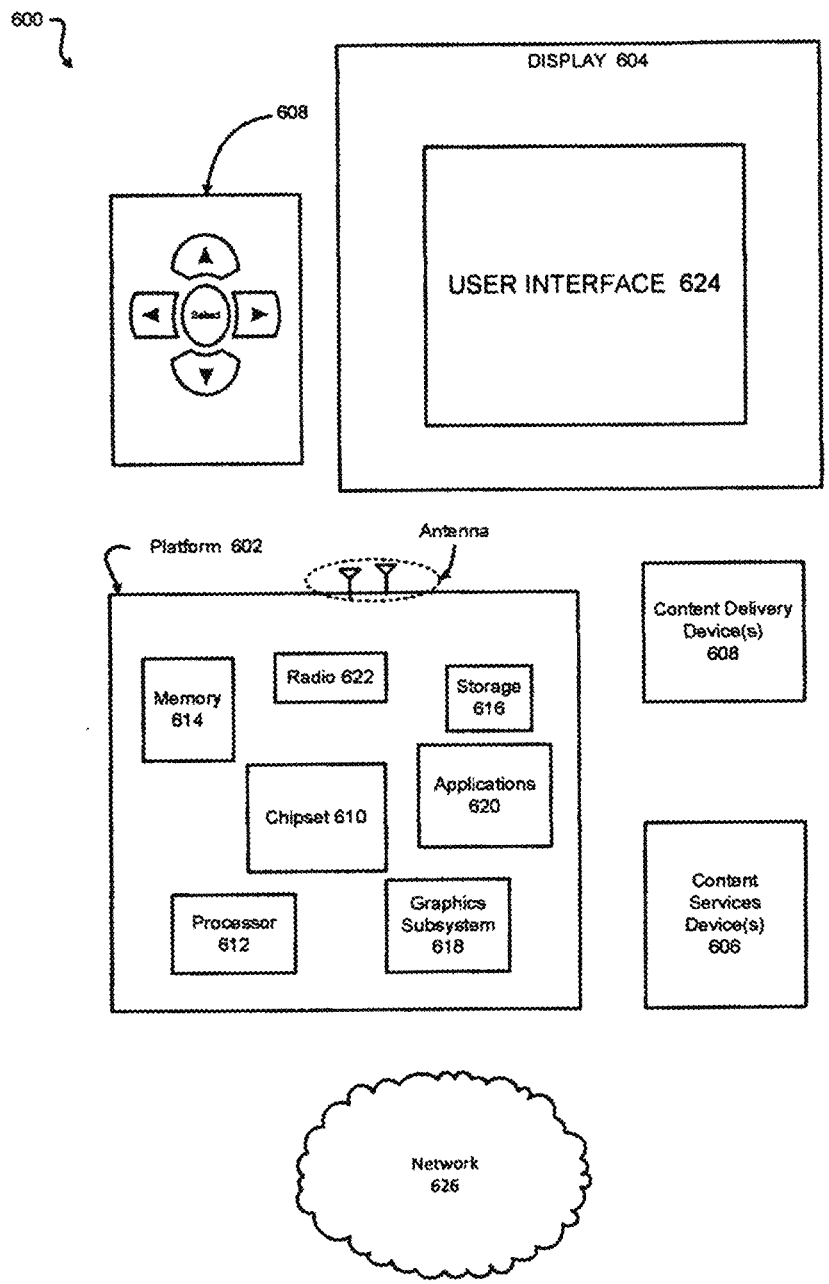
FIG. 6 illustrates an example system of a device that utilizes the modem thermal management in accordance with implementations herein.

FIG. 6 illustrates an example system 600 of a device in accordance with the present disclosure. For example, the apparatus 200 is a circuitry block within the example system 600. In various implementations, the system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 604. Platform 602 may receive content from a content device such as content services device(s) 606 or content delivery device(s) 608 or other similar content sources. A navigation controller 608 including one or more navigation features may be used to interact with, for example, platform 602 and/or display 604. Each of these components is described in greater detail below.

In various implementations, platform. 602 may include any combination of a chipset 610, processor 612, memory 614, storage 616, graphics subsystem 618, applications 620 and/or radio 622. Chipset 610 may provide intercommunication among processor 612, memory 614, storage 616, graphics subsystem 618, applications 620 and/or radio 622. For example, chipset 610 may include a storage adapter (not depicted) capable of providing intercommunication with storage 616.

Processor 612 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 614 may be implemented as a non-volatile memory device such as, the PCM memory cell. In an implementation, the memory 614 is coupled to the processor 612 and a transceiver circuit (e.g., radio 622), which utilizes the apparatus 200 in its circuitry block.

Storage 616 may be implemented as another non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 616 may include technology to increase the storage performance enhanced protection for valuable digital media when multiple hard drives are included, for example.

Graphics subsystem 618 may perform processing of images such as still or video for display. Graphics subsystem 618 may be a graphics processing unit (GPU) or a visual processing unit (VPU), for example. An analog or digital interface may be used to communicatively couple graphics subsystem 618 and display 604. For example, the interface may be any of a High-Definition Multimedia Interface, Display Port, wireless HDMI, and/or wireless HD compliant techniques. Graphics subsystem 618 may be integrated into processor 612 or chipset 610. In some implementations, graphics subsystem 618 may be a stand-alone card communicatively coupled to chipset 610.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 622 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version. Furthermore, the radio 622 is a part of a transceiver block in the system 600 that may utilize the apparatus 200 in its circuitry block.

In various implementations, display 604 may include any television type monitor or display. Display 604 may include, for example, a computer display screen, touch screen display, video monitor, television-like device, and/or a television. Display 604 may be digital and/or analog. In various implementations, display 604 may be a holographic display. In addition, display 604 may be a transparent surface that may receive a visual projection. Such projections may convey various forms of information, images, and/or objects. For example, such projections may be a visual overlay for a mobile augmented reality (MAR) application. Under the control of one or more software applications 620, platform 602 may display user interface 624 on display 604.

In various implementations, content services device(s) 606 may be hosted by any national, international and/or independent service and thus accessible to platform 602 via the Internet, for example. Content services device(s) 606 may be coupled to platform 602 and/or to display 604. Platform 602 and/or content services device(s) 606 may be coupled to a network 626 to communicate (e.g., send and/or receive) media information to and from network 626. Content delivery device(s) 608 also may be coupled to platform 602 and/or to display 604.

In various implementations, content services device(s) 606 may include a cable television box, personal computer, network, telephone, Internet enabled devices or appliance capable of delivering digital information and/or content, and any other similar device capable of unidirectionally or bidirectionally communicating content between content providers and platform 602 and/display 604, via network 626 or directly. It will be appreciated that the content may be communicated unidirectionally and/or bidirectionally to and from any one of the components in system 600 and a content provider via' network 626. Examples of content may include any media information including, for example, video, music, medical and gaming information, and so forth.

Content services device(s) 606 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 608 having one or more navigation features. The navigation features of controller 608 may be used to interact with user interface 624, for example. In embodiments, navigation controller 608 may be a pointing device that may be a computer hardware component (specifically; a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 608 may be replicated on a display (e.g., display 604) by movements of a pointer, cursor, focus ring, or other visual indicators displayed on the display. For example, under the control of software applications 620; the navigation features located on navigation controller 608 may be mapped to virtual navigation features displayed on user interface 624, for example. In embodiments, controller 608 may not be a separate component but may be integrated into platform 602 and/or display 604. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 606 or content delivery device(s) 608 even when the platform is turned "off." In addition, chipset 610 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 606 may be integrated, or platform 602 and content delivery device(s) 608 may be integrated, or platform 602, content services device(s) 606, and content delivery device(s) 608 may be integrated, for example. In various embodiments, platform 602 and display 604 may be an integrated unit. Display 604 and content service device(s) 606 may be integrated, or display 604 and content delivery device(s) 608 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic; and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message; voice mail message; alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
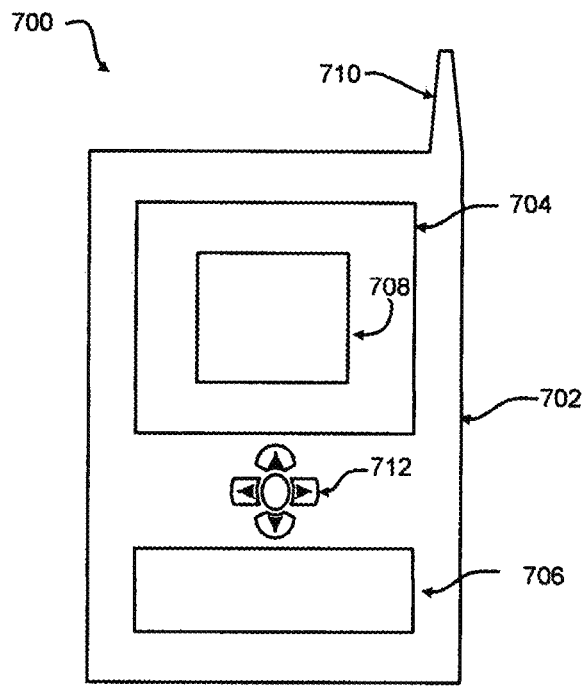
FIG. 7 illustrates an example device that utilizes the modem thermal management described in accordance with implementations herein.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display screen 704, an input/output (I/O) device 706, a network interface card (NIC) 708 and a transceiver component 710. Device 700 also may include navigation features 712. The display screen 704 may include any suitable display unit for displaying information appropriate for a mobile computing device. For example, the display screen 704 displays the personalized message that the personalized communication program may generate. The I/O device 706 may include any suitable I/O device or user interface (UI) for entering information into a mobile computing device such as when a user opts-in to the personalized communication program. Examples for I/O device 706 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits; circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of thermal management in a device, the method comprising:
configuring a look-up table (LUT) included in the device to comprise a data set of information and a corresponding recommended thermal throttling mode, wherein the data set of information comprises user-profile data, network-profile data that indicates parameters associated with communications between the device and one or more other external devices, and environmental-profile data that is indicative of conditions external to the device;
detecting present internal and external conditions associated with the device in accordance with the data set of information;
searching the LUT for the recommended thermal throttling mode that corresponds to the detected present internal and external conditions associated with the device; and
activating the recommended thermal throttling mode.

2. The method as recited in claim 1, wherein the configuring of the LUT further comprises:
collecting the data set of information;
filtering and summarizing the collected data set of information;
matching the recommended thermal throttling mode to the filtered and summarized collected data set of information; and
storing the filtered and summarized collected data set of information and the corresponding recommended thermal throttling mode in the LUT.

3. The method as recited in claim 2, wherein the summarized data set of information comprises a projected data set of information.

4. The method as recited in claim 1, wherein the data set of information comprises a measurement of a system-on-chip on the device and electric current measurements of the device.

5. The method as recited in claim 1, wherein activating the recommended thermal throttling mode comprises activating at least one of a burst-mode, a sustain-mode, and a traffic rescheduling-mode.

6. The method as recited in claim 5, wherein activating the traffic rescheduling mode comprises limiting of data rate traffic or rescheduling of transmission or reception of data to another time instant.

7. The method as recited in claim 1, wherein the user-profile data comprises types of applications, frequency of use of the applications, and an amount of data traffic for the applications.

8. The method as recited in claim 1, wherein the network-profile data comprises an amount of transmit power, a schedule of data transmission, and an identification of a particular base station.

9. The method as recited in claim 8, wherein the identification of a particular base station is by 3GPP provided cell identification.

10. The method as recited in claim 1, wherein the environmental-profile data comprises external ambient temperature for a particular geo-location of the device.

11. The method as recited in claim 1, wherein the detected present internal and external conditions associated with the device are identified from one of: the user-profile data, the network-profile data, and the environmental-profile data.

12. The method as recited in claim 1, wherein the present internal condition associated with the device comprises a type of application used by the device.

13. The method as recited in claim 1, further comprising:
    detecting another present condition associated with the device or ending of the activated recommended thermal throttling mode based upon a temperature threshold.

14. A system-on-a-chip (SoC) associated with a device, the SoC comprising:
    a look-up table (LUT) configured to comprise a data set of information and a corresponding recommended thermal throttling mode, wherein the data set of information includes user-profile data, network-profile data that indicates parameters associated with communications between the device and one or more other external devices, and environmental-profile data that is indicative of conditions external to the device;
    a profile detector configured to detect present internal and external conditions associated with the device in accordance with the data set of information;
    a processor configured to search the LUT for the recommended thermal throttling mode that corresponds to the detected present internal and external conditions associated with the device; and
    a thermal throttling engine configured to perform the recommended thermal throttling mode.

15. The SoC as recited in claim 14, wherein the detected present internal and external conditions associated with the device are identified from one of: the user-profile data, the network-profile data, and the environmental-profile data.

16. The SoC as recited in claim 14, wherein the LUT is pre-configured offline to:
    store a filtered and summarized collected data set of information and a corresponding recommended thermal throttling mode for the filtered and summarized data set of information.

17. The SoC as recited in claim 16, wherein the summarized data set of information comprises a projected data set of information.

18. The SoC as recited in claim 14, wherein the recommended thermal throttling mode comprises at least one or a combination of a burst-mode, a sustain-mode, and a traffic rescheduling-mode.

19. The SoC as recited in claim 18, wherein the traffic rescheduling mode comprises limiting of data rate traffic or rescheduling of transmission or reception of data to another time instant.

20. The system on a chip SoC as recited in claim 14, wherein the user-profile data comprises types of applications, frequency of use of the applications, and an amount of data traffic for the applications.

21. The SoC as recited in claim 14, wherein the user-profile data is related to time dependent consumption, data traffic generation, or data throughput requests.

22. A device transceiver comprising:
    a modem; and
    a thermal manager including:
        a look-up table (LUT) configured to comprise a data set of information and a corresponding recommended thermal throttling mode, wherein the data set of information includes user-profile data, network-profile data that indicates parameters associated with communications between the device transceiver and one or more other external devices, and environmental-profile data that is indicative of conditions external to the device transceiver; and
        a profile detector configured to detect present internal and external conditions associated with the device transceiver in accordance with the data set of information; and
    a processor configured to search the LUT for the recommended thermal throttling mode that corresponds to the detected present internal and external conditions associated with the device transceiver,
    wherein the thermal management module further includes a thermal throttling engine configured to perform the recommended thermal throttling mode.

23. The device transceiver as recited in claim 22, wherein the recommended thermal throttling mode includes at least one or a combination of a burst-mode, a sustain-mode, and a traffic rescheduling-mode.

24. The device transceiver as recited in claim 22, wherein the traffic rescheduling mode comprises limiting of data rate traffic or rescheduling of transmission or reception of data to another time instant.

* * * * *